United States Patent
Joh

(10) Patent No.: US 10,602,652 B1
(45) Date of Patent: Mar. 31, 2020

(54) WEEDING TOOL

(71) Applicant: Douglas L. Joh, Lucerne Valley, CA (US)

(72) Inventor: Douglas L. Joh, Lucerne Valley, CA (US)

(*) Notice: Subject to any disclaimer, the term of this patent is extended or adjusted under 35 U.S.C. 154(b) by 0 days.

(21) Appl. No.: 15/990,934

(22) Filed: May 29, 2018

(51) Int. Cl.
*A01B 1/08* (2006.01)
*A01B 1/16* (2006.01)

(52) U.S. Cl.
CPC . *A01B 1/16* (2013.01); *A01B 1/08* (2013.01)

(58) Field of Classification Search
CPC .... A01B 1/06; A01B 1/08; A01B 1/16; A01B 1/24
USPC ................... 172/361, 371, 378, 380; D8/11; 16/112.1
See application file for complete search history.

(56) References Cited

U.S. PATENT DOCUMENTS

| | | | | | |
|---|---|---|---|---|---|
| 31,977 | A | * | 4/1861 | Howard | A01B 1/08 172/381 |
| 298,926 | A | * | 5/1884 | Watson | A01B 1/08 172/381 |
| 318,148 | A | | 5/1885 | Still | |
| 417,444 | A | * | 12/1889 | Rufe | A01B 1/06 172/372 |
| 470,981 | A | * | 3/1892 | Burritt | A01B 1/14 172/378 |
| 533,169 | A | * | 1/1895 | Hart | A01B 1/08 172/381 |
| 781,638 | A | * | 2/1905 | Doan | A01B 1/16 254/132 |
| D57,302 | S | | 7/1920 | Barton | |
| 1,516,789 | A | * | 11/1924 | Rassner | B26B 5/005 30/314 |
| 1,650,463 | A | * | 11/1927 | Pitts | A01B 1/08 172/371 |
| 1,780,741 | A | * | 11/1930 | Cadwallader | A01B 1/08 172/375 |
| 2,015,916 | A | * | 10/1935 | Blocher | A01B 1/08 172/371 |
| 2,251,048 | A | | 7/1941 | Garland | |
| 2,343,616 | A | | 3/1944 | Franklin | |
| 3,156,305 | A | * | 11/1964 | Nash | A01B 1/08 172/381 |
| 5,287,935 | A | * | 2/1994 | Foeller | A01B 1/08 172/136 |
| 5,467,830 | A | * | 11/1995 | Watson | A01B 1/16 172/378 |

(Continued)

FOREIGN PATENT DOCUMENTS

GB        2463561        3/2010

*Primary Examiner* — Gary S Hartmann

(57) ABSTRACT

The weeding tool is a hand tool. The weeding tool is configured for use in agriculture. The weeding tool is adapted for use in removing a weed from a maintained plot. The weed is further defined with a root. By maintained plot is meant a plot of land that is either cultivated or landscaped. The weeding tool comprises a blade and a handle. The handle attaches to the blade. The blade is the working end of the weeding tool. The blade: 1) wedges itself into the weed; and, 2) pulls the weed out of the maintained plot by the root. The handle is an extension structure that: 1) connects the blade to the control grip, 2) is used to manipulate the blade; and, 3) allows the weeding tool to be used by a standing person.

13 Claims, 6 Drawing Sheets

(56) References Cited

U.S. PATENT DOCUMENTS

| | | | |
|---|---|---|---|
| D383,951 S | 9/1997 | Dutchak | |
| 6,213,527 B1 * | 4/2001 | Lampe | A01B 1/16 172/375 |
| 1,954,250 A1 | 1/2002 | Harding | |
| 6,415,874 B1 | 7/2002 | Gritzmach | |
| 6,446,733 B2 * | 9/2002 | Johnson | A01B 1/00 172/377 |
| 7,100,899 B2 * | 9/2006 | Hoover | A01B 1/16 254/132 |
| D704,519 S * | 5/2014 | Costley | D8/1 |
| 8,939,226 B2 | 1/2015 | Corsini | |
| 9,681,597 B1 * | 6/2017 | Henshaw | A01B 1/16 |
| D825,294 S * | 8/2018 | Raven | D8/9 |
| 2004/0075286 A1 * | 4/2004 | Skowron | A01B 1/00 294/58 |
| 2012/0132448 A1 * | 5/2012 | Costley | A01C 13/00 172/1 |
| 2018/0343782 A1 * | 12/2018 | Pool | A01B 1/16 |

* cited by examiner

WEEDING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and cultivation of vegetables, more specifically, a tool for cultivating turf and pulling out weeds.

SUMMARY OF INVENTION

The weeding tool is a hand tool. The weeding tool is configured for use in agriculture. The weeding tool is adapted for use in removing a weed from a maintained plot or not. The weed is further defined with a root. By maintained plot is meant a plot of land that is either cultivated or landscaped. The weeding tool comprises a blade and a handle. The handle attaches to the blade. The blade is the working end of the weeding tool. The blade: 1) wedges itself into the weed; and, 2) pulls the weed out of the maintained plot by the root. The handle is an extension structure that: 1) is used to manipulate the blade; and, 2) allows the weeding tool to be used by a standing person.

These together with additional objects, features and advantages of the weeding tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the weeding tool in detail, it is to be understood that the weeding tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the weeding tool.

It is therefore important that the claims be regarded as including such equivalent construction insofar as they do not depart from the spirit and scope of the weeding tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
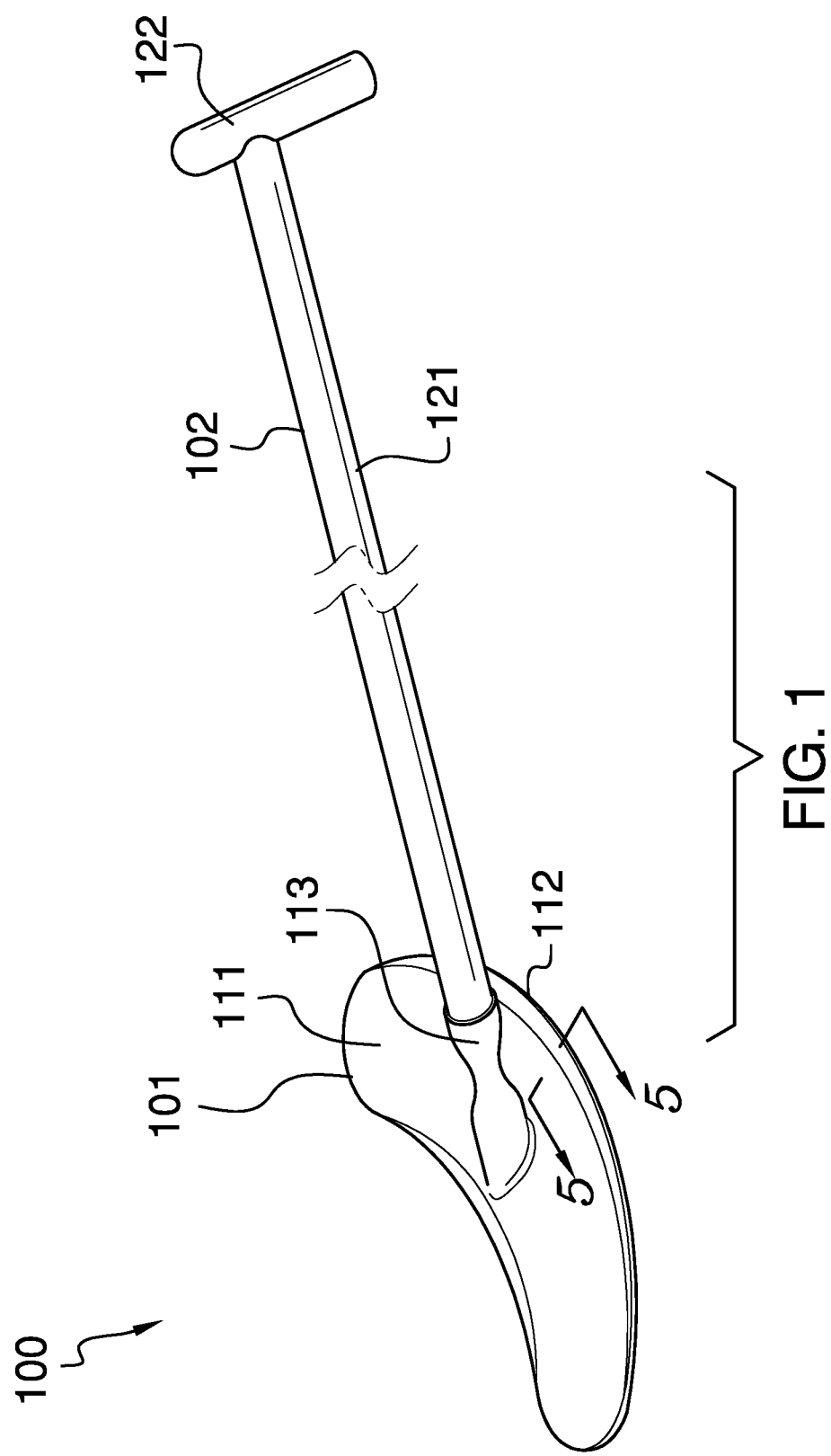
FIG. 1 is a perspective view of an embodiment of the disclosure.
Figure 2:
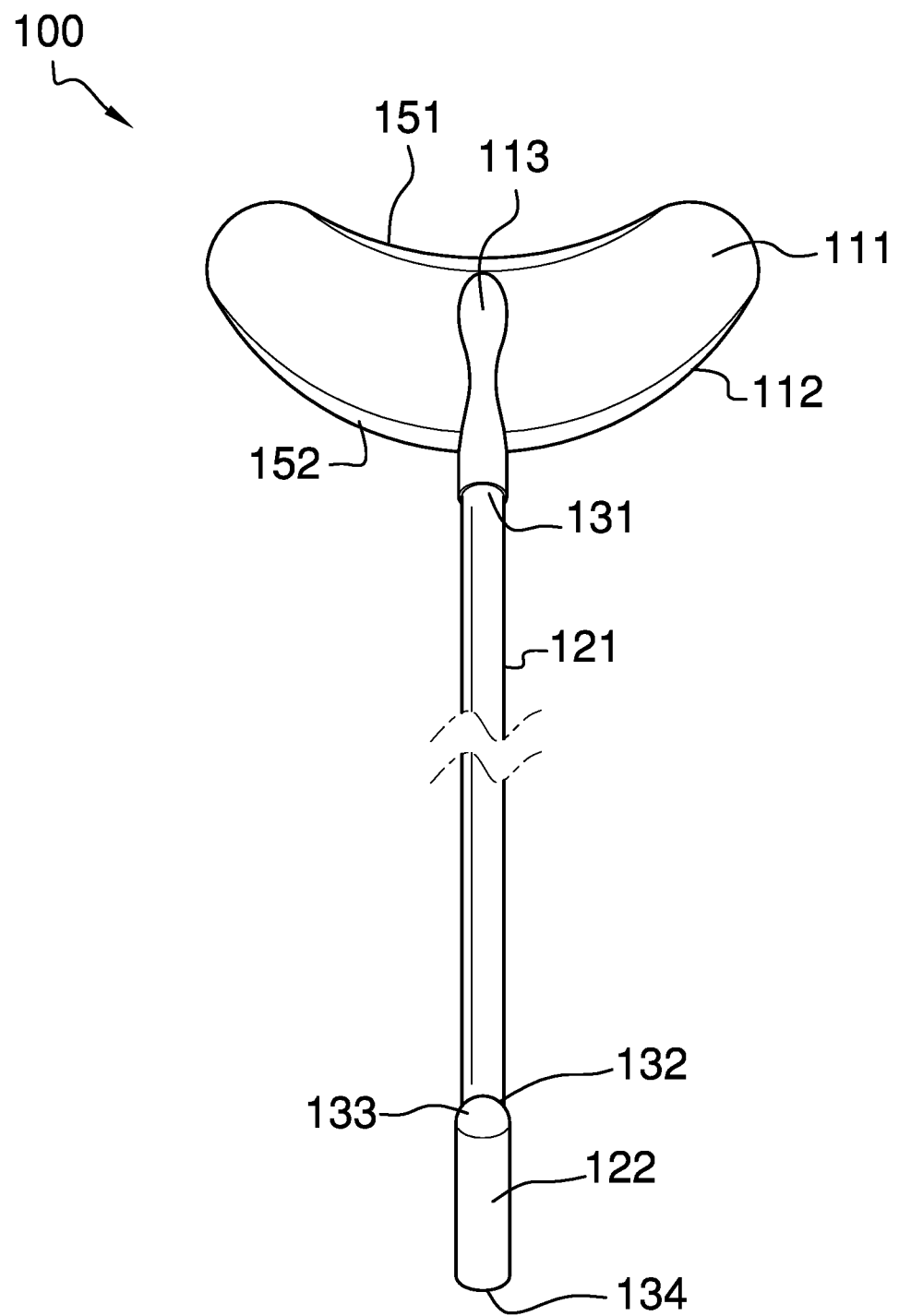
FIG. 2 is a top view of an embodiment of the disclosure.
Figure 3:
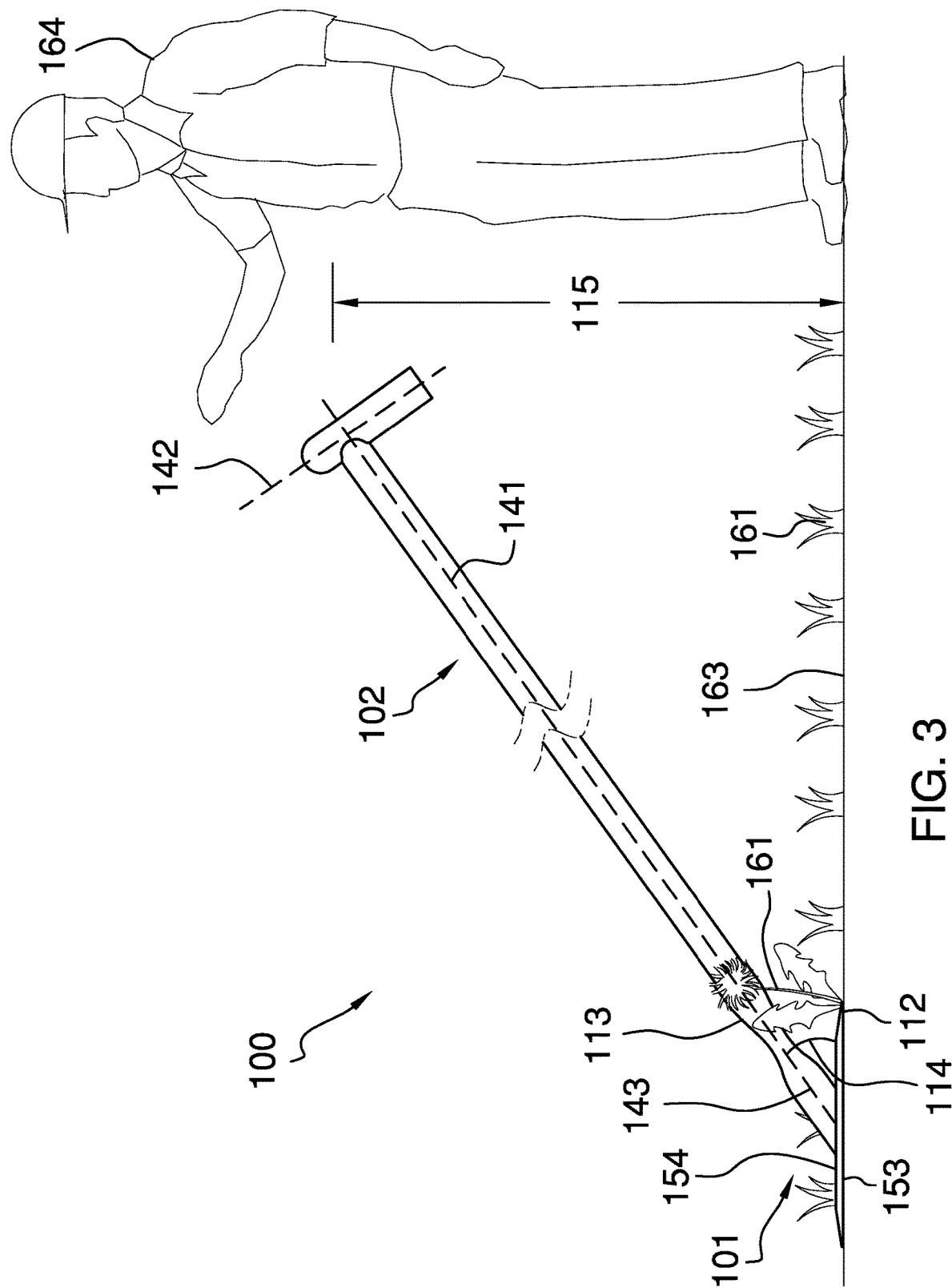
FIG. 3 is a side view of an embodiment of the disclosure.
Figure 4:
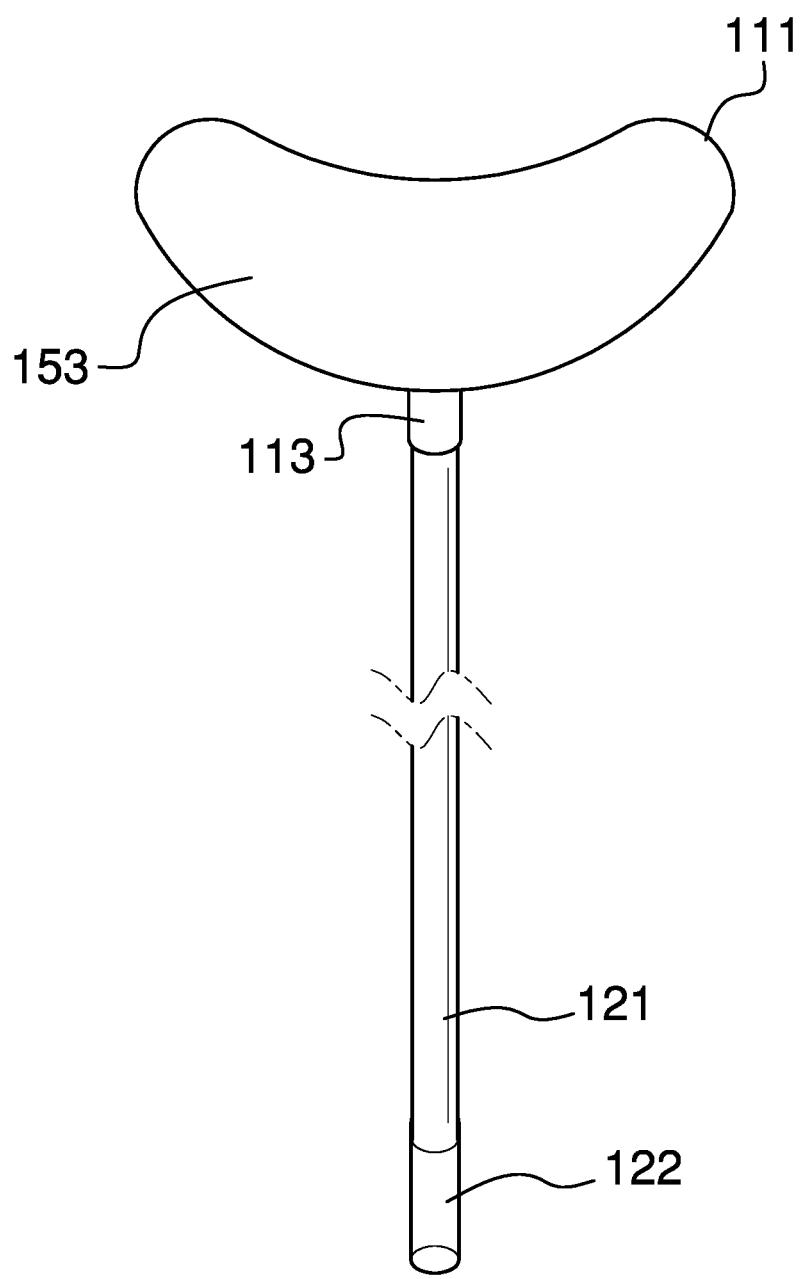
FIG. 4 is a bottom view of an embodiment of the disclosure.
Figure 5:
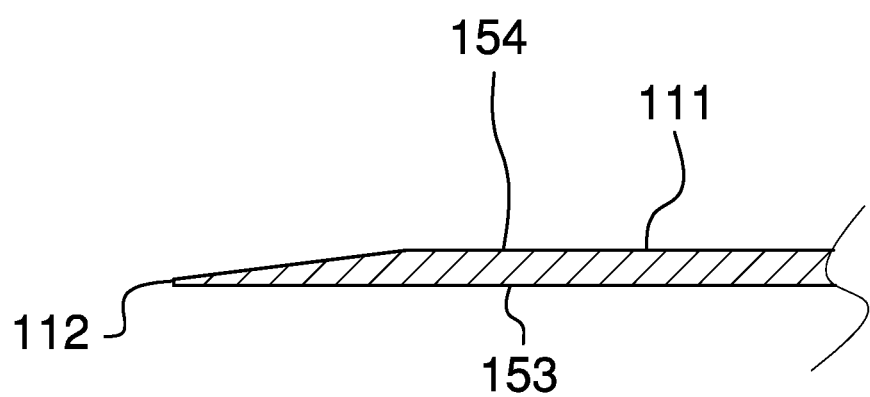
FIG. 5 is a cross-sectional view of an embodiment of the disclosure across 5-5 as shown in FIG. 1.
Figure 6:
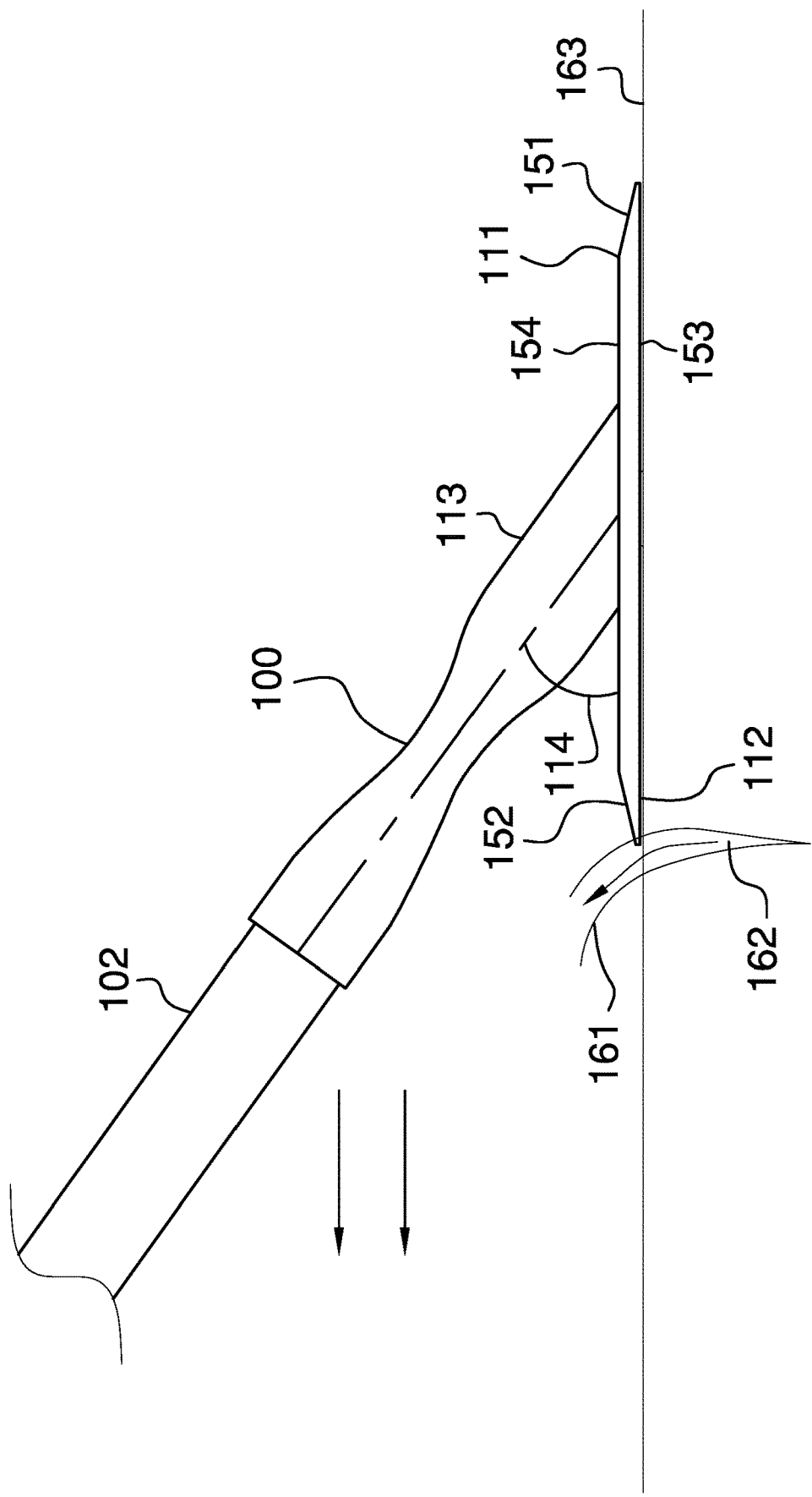
FIG. 6 is a detail view of an embodiment of the disclosure.

Detailed reference will now be made to one or more potential embodiments of the disclosure, which are illustrated in FIGS. 1 through 6.

The weeding tool 100 (hereinafter invention) is a hand tool. The invention 100 is configured for use in agriculture. The invention 100 is adapted for use in removing a weed 161 from a maintained plot 163. The weed 161 is further defined with a root 162. By maintained plot 163 is meant a plot of land that is either cultivated or landscaped. The invention 100 comprises a blade 101 and a handle 102. The handle 102 attaches to the blade 101. The blade 101 is the working end of the invention 100. The blade 101: 1) wedges itself into the weed; and, 2) pulls the root 162 of the weed 161 out of the maintained plot 163. The handle 102 is an extension structure that: 1) is used to manipulate the blade 101; and, 2) allows the invention 100 to be used by a standing person 164.

The blade 101 is a tool that is formed with a cutting edge. The blade 101 is pushed and pulled along the surface of the maintained plot 163 such that the cutting edge of the blade 101 wedges into a weed 161. As the cutting edge of the blade 101 wedges itself into the weed 161, the blade 101 drags the weed 161 along the surface of the maintained plot 163 such that the root 162 of the weed 161 is pulled out of the maintained plot during the weeding process. The blade 101 comprises a crescent structure 111, a cutting bevel 112, and a collar 113. The crescent structure 111 is further defined with an anterior edge 151, a posterior edge 152, an inferior surface 153, and a superior surface 154. The collar 113 is further defined with a third center axis 143, an extension angle 114, and an elevation 115.

The crescent structure 111 is a crescent-shaped structure. The crescent structure 111 is formed from a structural metal such as steel. The crescent structure 111 is a plate structure.

The crescent structure 111 sits flush to the maintained plot 163 as the crescent structure 111 is pushed and pulled across the surface of the maintained plot 163.

The anterior edge 151 is the curved edge of the crescent structure 111 that is proximal to the standing person 164 during normal use of the invention 100. The posterior edge 152 is the curved edge of the crescent structure 111 that is distal from the anterior edge 151. The inferior surface 153 is the surface of the crescent structure 111 that is pushed and pulled along the surface of the maintained plot 163 during normal use of the invention 100. The superior surface 154 is the surface of the crescent structure 111 that is distal from the inferior surface 153.

The cutting bevel 112 is a bevel that is formed around the anterior edge 151 of the crescent structure 111. The cutting bevel 112 is sharpened to form the cutting edge of the blade 101. The cutting edge of the cutting bevel 112 is formed at the brink formed by the posterior surface 154 of the crescent structure 111 and the angled surface formed by the cutting bevel 112.

The collar 113 is a socket. The collar 113 attaches to the superior surface 154 of the crescent structure 111. The collar 113 is sized such that the first end 131 of the shaft 121 inserts into and attaches to the collar 113. The shaft 121 inserts into the collar 113 such that the first center axis 141 of the shaft 121 aligns with the third center axis 143 of the collar 113.

The extension angle 114 is the angle that is formed between the third center axis 143 of the collar 113 and the plane formed by the superior surface 154 of the crescent structure 111. The selected arc of the extension angle 114 determines the elevation 115 of the handle 102. The elevation 115 refers to the span of the vertical distance from the surface of the maintained plot 163 to the first center axis 141 at the second end 132 of the shaft 121.

The handle 102 is a cylindrical shaft. The handle 102 forms an extension structure that separates the blade 101 from a standing person 164 such that the standing person 164 can stand while using the invention 100. The handle 102 is used to manipulate the blade 101 of the invention 100. The handle 102 comprises a shaft 121 and a control grip 122. The shaft 121 is further defined with a first end 131, a second end 132, and a first center axis 141. The control grip 122 is further defined with a third end 133, a fourth end 134, and a second center axis 142.

The shaft 121 is a cylindrical structure. The shaft 121 attaches the blade 101 to the control grip 122. It is preferred that the length of the shaft 121 be greater than six feet (>180 cm). It is preferred that the shaft 121 is formed from fiberglass.

The control grip 122 allows the standing person 164 to pull on the shaft 121 such that the blade 101 is drawn towards the standing person 164. The control grip 122 is a cylindrical structure. The third end 133 of the control grip 122 is the end of the control grip 122 that is distal from the maintained plot 163. Wherein the fourth end 134 of the control grip 122 is distal from the third end 133. The control grip 122 attaches to the second end 132 of the shaft 121 such that the second center axis 142 of the control grip 122 is perpendicular to the first center axis 141 of the shaft 121. The control grip 122 attaches to the second end 132 of the shaft 121 such that the second center axis 142 of the control grip 122 is parallel to the vertical plane.

The control grip 122 attaches to the second end 132 of the shaft 121 such that the span of the distance from the third end 133 of the control grip 122 to the intersection of the first center axis 141 and the second center axis 142 is between: 1) one quarter of the span of the distance between the third end 133 of the control grip 122 and the fourth end 134 of the control grip 122; and, 2) three-eighths of the span of the distance between the third end 133 of the control grip 122 and the fourth end 134 of the control grip 122.

It is preferred that the span of the distance between the third end 133 of the control grip 122 and the intersection of the first center axis 141 of the second center axis 142 be one-third of the span of the distance between the third end 133 of the control grip 122 and the fourth end 134 of the control grip 122.

The following definitions were used in this disclosure:

Arc: As used in this disclosure, an arc refers to a portion of a circumference or a curved perimeter. When applied to an angle, the arc also refers to a measure of an angular span as measured from a circle at the vertex formed by the sides of the angle.

Bevel: As used in this disclosure, a bevel is a slope formed in the edge or surface of an object.

Blade: As used in this disclosure, a blade is a term that is used to describe: 1) a wide and flat portion of a structure; or, 2) the cutting edge of a tool.

Brink: As used in this disclosure, a brink refers to the edge or line formed by the intersection of a first plane or surface and a second plane or surface where a cant exists between the first plane or surface and the second plane or surface.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Crescent: As used in this disclosure, a crescent is a two-edged geometric shape formed from the overlapping of a second circle over a first circle. The diameter of the first circle and the diameter of the second circle may or may not be identical. The first circle and the second circle may or may not share a common center point. The crescent is formed by: 1) overlaying the second circle on the first circle such that two points of intersection are formed; 2) using the second circle as a negative space that removes the area and segment of the circumference of the first circle that is contained within the second circle, and 3) replacing the removed circumference of the first circle with the segment of the circumference of the second circle contained within the area of the first circle to form the second edge of the crescent. Within the scope of this definition an ellipse may be substituted for either (or both) of the first circle and the second circle. Further, within the scope of this definition either (or both) of the two intersection points may be rounded, as defined elsewhere in this disclosure.

Cutting Edge: As used in this disclosure, a cutting edge is the sharpened edge of a tool that is used to remove an object.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Ellipse: As used in this disclosure, an ellipse is a curve described by the equation $(x/a)^2+(y/b)^2=c$.

Extension Structure: As used in this disclosure, an extension structure is an inert physical structure that is used to extend the span of the distance between any two objects.

Furcate: As used in this disclosure, to furcate or furcation refers to the division of an object into a plurality branches, pieces or segments.

Control grip: As used in this disclosure, a control grip is an accommodation formed on or within an object that allows the object to be grasped or manipulated by a hand.

Hand Tool: As used in this disclosure, a hand tool refers to a tool that is small and light enough to allow a person to hold the tool during use.

Handle: As used in this disclosure, a handle is an object by which a tool, object, or is connected to and extended to the control grip.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Negative Space: As used in this disclosure, negative space is a method of defining an object through the use of open or empty space as the definition of the object itself, or, through the use of open or empty space to describe the boundaries of an object.

Plate: As used in this disclosure, a plate is a smooth, flat and semi-rigid or rigid structure that has at least one dimension that: 1) is of uniform thickness; and 2) that appears thin relative to the other dimensions of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder.

Radial: As used in this disclosure, the term radial refers to a direction that: 1) is perpendicular to an identified central axis; or, 2) projects away from a center point.

Root: As used in this disclosure, a root is the portion of a plant that is below the surface of the ground.

Rounded: A used in this disclosure, the term rounded refers to the replacement of an apex, vertex, or edge or brink of a structure with a (generally smooth) curvature wherein the concave portion of the curvature faces the interior or center of the structure.

Shaft: As used in this disclosure, a shaft is a long, narrow and rigid prism structure that is used as: 1) a structural element of a larger object; or 2) as a control grip or lever for a handle. Shafts are often cylindrical in shape.

Socket: As used in this disclosure, a socket is an opening or cavity that is configured to receive an inserted component.

Tool: As used in this disclosure, a tool is a device, an apparatus, or an instrument that is used to carry out an activity, operation, or procedure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wedge: As used in this disclosure, to wedge is a verb that refers to forcing an object into a space that is slightly smaller than the object itself.

Weed: As used in this disclosure, a weed refers to an unwanted plant growing in a cultivated space. When used as a verb, to weed means to remove one or more weeds from the cultivated space.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A weeding tool comprising:
a blade and a handle;
wherein the handle attaches to the blade;
wherein the weeding tool is a hand tool;

wherein the weeding tool is configured for use in agriculture;
wherein the weeding tool is adapted for use by a standing person;
wherein the weeding tool is adapted for use in removing a weed having a root from a maintained plot;
wherein the blade is capable of wedging the weed;
wherein the blade is capable of pulling the root of the weed out of the maintained plot;
wherein the blade is formed with a cutting edge;
wherein the blade is capable of pushing and pulling along the surface of the maintained plot;
wherein the handle is a cylindrical shaft;
wherein the handle forms an extension structure;
wherein the handle separates the blade from the standing person;
wherein the handle manipulates the blade of the weeding tool;
wherein the blade comprises a crescent structure, a cutting bevel, and a collar;
wherein the collar attaches to the crescent structure;
wherein the crescent structure is further defined with an anterior edge, a posterior edge, an inferior surface, and a superior surface;
wherein the anterior edge is the curved edge of the crescent structure that is proximal in use to the standing person;
wherein the posterior edge is the curved edge of the crescent structure that is distal from the anterior edge;
wherein the inferior surface is the surface of the crescent structure that is drawn along the surface of the maintained plot during normal use of the weeding tool;
wherein the superior surface is the surface of the crescent structure that is distal from the inferior surface;
wherein the collar is further defined with a third center axis, an extension angle, and an elevation;
wherein the extension angle is an angle that is formed between the third center axis of the collar and the plane formed by the superior surface of the crescent structure;
wherein the collar is a socket;
wherein the collar attaches to the superior surface of the crescent structure;
wherein the collar is sized such that the first end of the shaft inserts into and attaches to the collar;
wherein the shaft inserts into the collar such that the first center axis of the shaft aligns with the third center axis of the collar;
wherein a selected arc of the extension angle determines the elevation.

2. The weeding tool according to claim 1 wherein the crescent structure is formed from a structural metal.

3. The weeding tool according to claim 2
wherein the crescent structure is a plate structure;
wherein the crescent structure sits flush to the maintained plot as the crescent structure is pushed and pulled across the surface of the maintained plot.

4. The weeding tool according to claim 3
wherein the cutting bevel is formed all the way around the anterior edge of the crescent structure;
wherein the cutting bevel forms the cutting edges of the blade.

5. The weeding tool according to claim 4 wherein the cutting edge of the cutting bevel is formed at a brink formed by the posterior surface of the crescent structure and the angled surface formed by the cutting bevel.

6. The weeding tool according to claim 5
wherein the handle comprises the shaft and a control grip;
wherein the shaft attaches the blade to the control grip;
wherein the shaft is further defined with a first end, a second end, and a first center axis;
wherein the control grip is further defined with a third end, a fourth end, and a second center axis;
wherein the first end of the handle inserts into the collar;
wherein the third end of the control grip is the end of the control grip that is distal from the maintained plot;
wherein the elevation is further defined as the span of the vertical distance from the surface of the maintained plot to the first center axis at the second end of the shaft.

7. The weeding tool according to claim 6
wherein the shaft is a cylindrical structure;
wherein the control grip is a cylindrical structure;
wherein the standing person pushes and pulls on the control grip to push and pull the blade away from the standing person.

8. The weeding tool according to claim 7, wherein the control grip attaches to the second end of the shaft such that the second center axis of the control grip is perpendicular to the first center axis of the shaft.

9. The weeding tool according to claim 8 wherein the control grip attaches to the second end of the shaft such that the second center axis of the control grip is parallel to a vertical plane.

10. The weeding tool according to claim 9 wherein the control grip attaches to the second end of the shaft such that the span of the distance from the third end of the control grip to the intersection of the first center axis and the second center axis is greater than or equal to one quarter of the span of the distance between the third end of the control grip and the fourth end of the control grip.

11. The weeding tool according to claim 10 wherein the control grip attaches to the second end of the shaft such that the span of the distance from the third end of the control grip to the intersection of the first center axis and the second center axis is lesser than or equal to three-eighths of the span of the distance between the third end of the control grip and the fourth end of the control grip.

12. The weeding tool according to claim 11 wherein the crescent structure is formed from steel.

13. The weeding tool according to claim 12
wherein the length of the handle is greater than or equal to six feet;
wherein the handle is formed from fiberglass.

\* \* \* \* \*